US010289553B2

(12) United States Patent
Gou et al.

(10) Patent No.: US 10,289,553 B2
(45) Date of Patent: May 14, 2019

(54) ACCELERATOR SHARING

(71) Applicant: International Business Machines Corporation, Armonk, NY (US)

(72) Inventors: Peng Fei Bg Gou, Shanghai (CN); Yang Liu, Shanghai (CN); Yang Fan El Liu, Shanghai (CN); Yong Lu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 15/336,724

(22) Filed: Oct. 27, 2016

(65) Prior Publication Data

US 2018/0121357 A1 May 3, 2018

(51) Int. Cl.
*G06F 12/0813* (2016.01)
*G06F 12/0817* (2016.01)

(52) U.S. Cl.
CPC ...... *G06F 12/0813* (2013.01); *G06F 12/0824* (2013.01); *G06F 2212/1021* (2013.01); *G06F 2212/154* (2013.01); *G06F 2212/62* (2013.01)

(58) Field of Classification Search
USPC ...................................................... 711/141
See application file for complete search history.

(56) References Cited

U.S. PATENT DOCUMENTS

| 8,719,547 | B2 | 5/2014 | Chinya et al. |
| 9,069,674 | B2 | 6/2015 | Blaner et al. |
| 2014/0236561 | A1 | 8/2014 | Dusanapudi et al. |
| 2015/0317275 | A1 | 11/2015 | Arroyo et al. |

OTHER PUBLICATIONS

Bruce Wile—IBM; Enterprise 2014—Coherent Accelerator Processor Proxy (CAPI) on POWER8; 2014 (Year: 2014).*
Wile, Bruce; "Coherent Accelerator Processor Interface (CAPI) for POWER8 Systems"; International Business Machines Corporation; <http://www.nallatech.com/wp-content/uploads/CAPI_POWER8.pdf>.
Stuecheli et al.; "CAPI: A Coherent Accelerator Processor Interface"; <http://ieeexplore.ieee.org/xpl/login.jsp?tp=&arnumber=7029171&url=http%3A%2F%2Fieeexplore.ieee.org%2Fiel7%2F5288520%2F7029148%2F07029171>.
Wilson, Ron; "Attaching Accelerators in Multicore Systems"; Altera Corporation; <http://web.archiye.org/web/20161028003616/http://systemdesign.altera.com/attaching-accelerators-in-multicore-systems-2/>.
International Business Machines Corporation; "IBM POWER8 processor and memory buffer products"; <http://www.talconsulta.it/doc/IBM_POWER8.pdf>.

* cited by examiner

*Primary Examiner* — Mardochee Chery
(74) *Attorney, Agent, or Firm* — Timothy J. Singleton

(57) ABSTRACT

Disclosed aspects relate to accelerator sharing among a plurality of processors through a plurality of coherent proxies. The cache lines in a cache associated with the accelerator are allocated to one of the plurality of coherent proxies. In a cache directory for the cache lines used by the accelerator, the status of the cache lines and the identification information of the coherent proxies to which the cache lines are allocated are provided. Each coherent proxy maintains a shadow directory of the cache directory for the cache lines allocated to it. In response to receiving an operation request, a coherent proxy corresponding to the request is determined. The accelerator communicates with the determined coherent proxy for the request.

14 Claims, 7 Drawing Sheets

| Accelerator Cache Directory |||
|---|---|---|
| Cache Line #1 | Status | Proxy #1 |
| Cache Line #2 | Status | Proxy #2 |
| Cache Line #3 | Status | Proxy #1 |
| Cache Line #4 | Status | Proxy #2 |
| ...... | ...... | ...... |

| Coherent Proxy #1 Shadow Directory ||
|---|---|
| Cache Line #1 | Status |
| Cache Line #3 | Status |
| ...... | ...... |

| Coherent Proxy #1 Shadow Directory ||
|---|---|
| Cache Line #2 | Status |
| Cache Line #4 | Status |
| ...... | ...... |

FIG. 5

ACCELERATOR SHARING

BACKGROUND

This disclosure relates generally to computer systems and, more particularly, relates to off-chip coherent accelerator such as sharing an accelerator among a plurality of processors through a plurality of coherent proxies.

Information Technology (IT) organizations may provide increased system performance as their workloads grow with demands for big data analysis, social media applications, continuous customer connectivity, and business-specific applications. Increases in processor performance alone may not be able to satisfy the workload demands, so system-level advances such as hybrid computing may play a role. Accordingly, acceleration engines and hybrid computing are potential strategies for system-level performance gain.

SUMMARY

Example embodiments of the present disclosure provide a method, a device, and a computer program product for sharing an accelerator among a plurality of processors through a plurality of coherent proxies.

In an aspect, a device for sharing an accelerator among a plurality of processors through a plurality of coherent proxies is provided. The device comprises a cache associated with the accelerator, a local store for storing cache allocation information indicating the allocation of the cache lines in the cache to one of a plurality of coherent proxies, and a cache directory for the cache lines used by the accelerator, including the status of the cache lines and the identification information of the coherent proxies to which the cache lines are allocated. Each coherent proxy maintains a shadow directory of the cache directory for the cache lines allocated to it. The device is configured to, in response to receiving an operation request, determine a coherent proxy corresponding to the request, and communicate with the determined coherent proxy for the request.

In another aspect, a method for sharing an accelerator among a plurality of processors through a plurality of coherent proxies is provided. According to the method, the cache lines in a cache associated with the accelerator are allocated to one of the plurality of coherent proxies. In a cache directory for the cache lines used by the accelerator, the status of the cache lines and the identification information of the coherent proxies to which the cache lines are allocated are provided. And each coherent proxy maintains a shadow directory of the cache directory for the cache lines allocated to it. In response to receiving an operation request, a coherent proxy corresponding to the request is determined. And the accelerator communicates with the determined coherent proxy for the request.

In yet another aspect, a computer program product is provided. The computer program product is tangibly stored on a non-transient machine-readable medium and comprises machine-executable instructions. When executed on a device, the instructions cause the device to: allocate the cache lines in a cache associated with the accelerator to one of the plurality of coherent proxies; in a cache directory for the cache lines used by the accelerator, include the status of the cache lines and the identification information of the coherent proxies to which the cache lines are allocated, wherein each coherent proxy maintains a shadow directory of the cache directory for the cache lines allocated to it; in response to receiving an operation request, determine a coherent proxy corresponding to the request; and communicate with the determined coherent proxy for the request.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 shows examples of the cache directory in the accelerator and shadow directories in the corresponding coherent proxies respectively in accordance with exemplary embodiments of the present disclosure.

Figure 1:
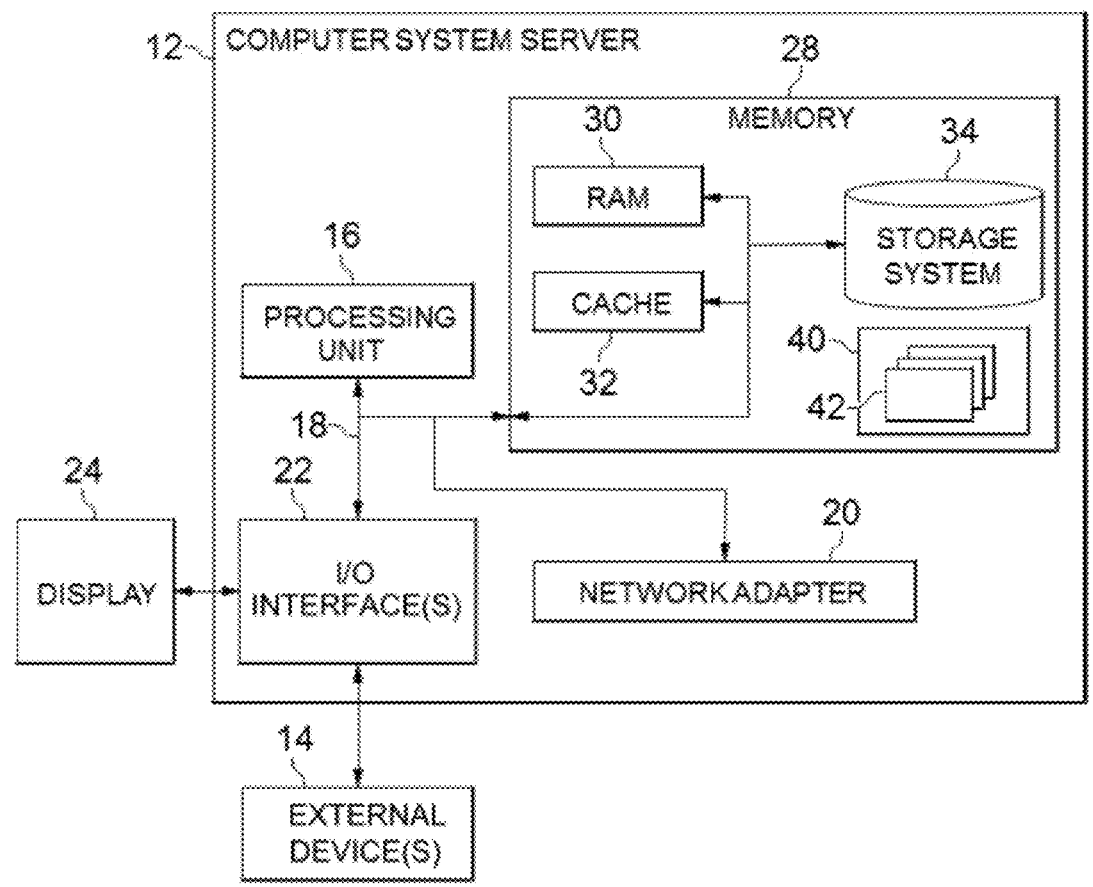
FIG. 1 is a block diagram illustrating a device suitable for implementing embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The Coherent Accelerator Processor Interface (CAPI) on IBM® POWER8™ system provides solution architects with a way to gain system-level performance. CAPI connects a custom acceleration engine to the coherent fabric of the POWER8 chip. The hybrid solution has a simple programming paradigm while delivering performance well beyond today's I/O attached acceleration engines.

The CAPI provides a high-performance solution for the implementation of client-specific, computation-heavy algorithms on an FPGA. CAPI removes the overhead and complexity of the I/O subsystem, allowing an accelerator to operate as part of an application.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

In the CAPI paradigm, the specific algorithm for acceleration is contained in a unit on the FPGA called the accelerator function unit (AFU accelerator). The purpose of an AFU is to provide applications with a higher computational unit density for customized functions to improve the performance of the application and offload the host processor.

There is a dedicated silicon area on the chip that enables a client-defined hybrid-computing engine to act as a peer to the multiple POWER8 cores on the chip. The unit on the POWER8 chip, called the coherent accelerator processor proxy (CAPP) unit, participates directly in the POWER8 core coherency protocols on behalf of the acceleration engines. The CAPP unit maintains a directory of all cache lines held by the off-chip accelerator, allowing it to act as the proxy that maintains architectural coherence for the accelerator across its virtual memory space.

There is also a POWER service layer (PSL) that resides on the FPGA alongside of the acceleration engine. The PSL works in concert with the CAPP unit across a PCIe connection. This connection is completely managed by the POWER8 chip and the PSL, allowing the client to focus on their accelerator algorithm. The PSL provides a straightforward command→data buffer→command response interface to the client-written accelerator, which grants access to coherent memory.

The PSL contains a resident cache on behalf of the accelerator. Based on the needs of the algorithm, the accelerator can direct the use of the cache via the type of memory accesses (reads/write) as cacheable or noncacheable.

Each POWER8 processor chip contains a symmetric multi-processor (SMP) bus interconnection fabric which enables the various units to communicate and coherently share system memory. On the POWER8 processor chip, the PCIe Host Bridge (PHB) provides connectivity to PCIe Gen3 I/O links. The Coherent Accelerator Processor Proxy (CAPP) unit, in conjunction with the PHB, act as memory coherence, data transfer, interrupt, and address translation agents on the SMP interconnect fabric for PCIe-attached accelerators. These accelerators comprise a POWER Service Layer (PSL) and Accelerator Function Units (AFUs) that reside in an FPGA or ASIC connected to the processor chip by the PCIe Gen3 link. The combination of PSL, PCIe link, PHB, and CAPP provide AFUs with several capabilities. AFUs may operate on data in memory coherently, as peers of other caches in the system.

Figure 2:
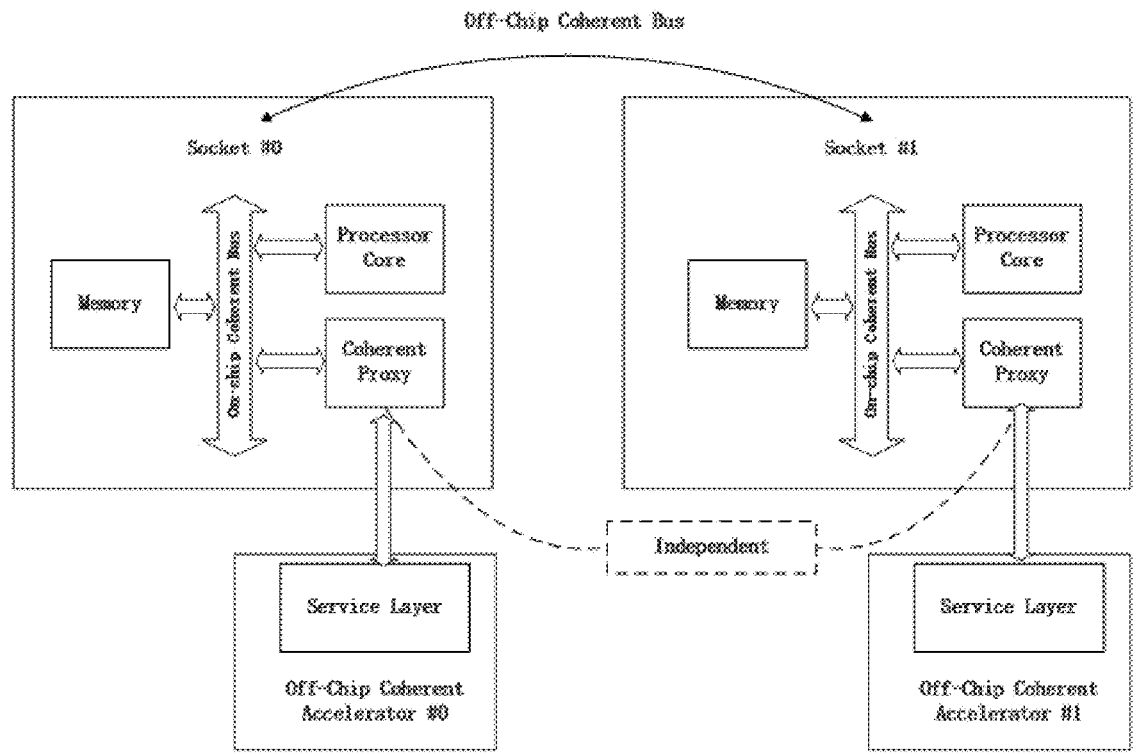
FIG. 2 shows an exemplary block diagram of a current SMP system with off-chip coherent accelerator configuration.

FIG. 2 shows an exemplary block diagram of a current SMP system with off-chip coherent accelerator configuration.

In current SMP system, one accelerator device communicates with one coherent proxy using PCIe link. For example, in FIG. 2, Off-chip Coherent Accelerator #0 communicates with Coherent Proxy in the socket #0, and Off-chip Coherent Accelerator #1 communicates with Coherent Proxy in the socket #1. To implement cache coherency, the accelerator instantiates data cache associated with directory to store data and record the coherent state of the data. In order to minimize the coherent communication overhead between the accelerator and processor core on PCIe link, the cache proxy resident in process chip introduces the shadow directory of the accelerator's directory to involve in the coherency snooping operation in processor chip. The shadow directory of cache proxy is exactly the same with the corresponding accelerator's directory. The cache proxy will snoop the coherent transactions on the processor chip local bus, then check the coherent state in the shadow directory to determine whether to communicate with the accelerator's data cache for state change or data fetch.

In the exemplary diagram as shown in FIG. 2, two sockets are illustrated. Each socket has a corresponding off-chip coherent accelerator, which communicates with each socket through a coherent proxy.

When a processor core from a remote socket, e.g. socket #1 wants to access the accelerator #0, it could not communicate with that accelerator #0 through its own coherent proxy directly. Instead, the request from the remote processor core in socket #1 has to be transmitted to socket #0 through off-chip coherent bus between socket #0 and socket #1, then transmitted to the accelerator #0 through the coherent proxy in socket #0. This makes current solution suffering from long access latency from remote sockets via SMP bus, reduced SMP bandwidth efficiency between sockets, and poor coherent proxy hardware utilization (since only one coherent proxy is enabled for the accelerator).

Figure 3:
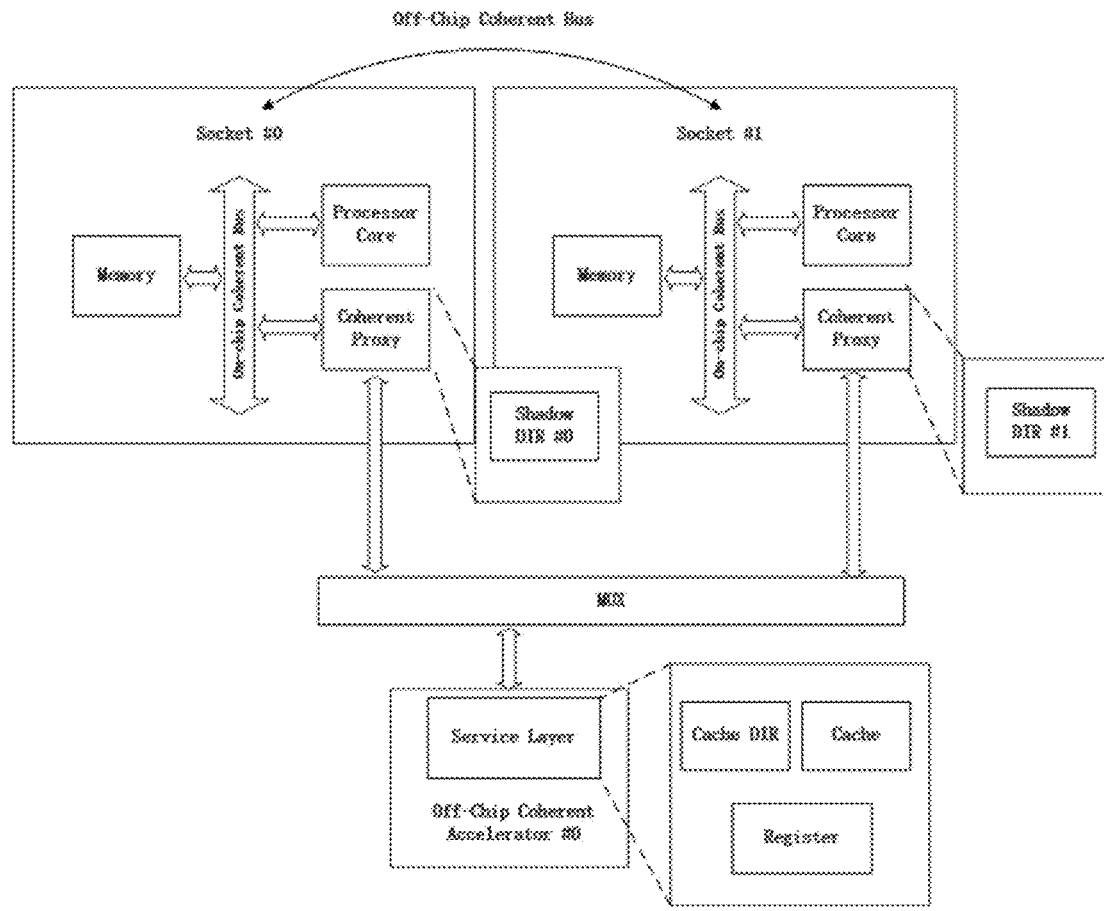
FIG. 3 shows schematic diagrams of an example accelerator sharing system according to the aspects of the present disclosure.

Considering the above issues in current off-chip coherent accelerator solution, according to the aspects of the present disclosure, it's proposed to share an accelerator with multiple coherent proxies. FIG. 3 shows schematic diagrams of an example accelerator sharing system according to the aspects of the present disclosure.

According to one exemplary embodiment of the present disclosure, on accelerator side, there is a cache associated with the accelerator. And a local store for storing cache allocation information is provided. According to one embodiment, the local store may be a register in the accelerator. The cache allocation information indicating the allocation of the cache lines in a cache for the accelerator to one of the plurality of coherent proxies. The local store may be initiated by the hypervisor. And in a cache directory for the cache lines used by the accelerator, there may be the status of the cache lines and the identification information of the coherent proxies to which the cache lines are allocated. The identification information may be the ID information of coherent proxy, indicating which coherent proxy contains the shadow directory for the cache lines allocated to it. The identification information may be added to the cache directory according to the cache allocation information stored in the register. Each coherent proxy maintains a part of the directory entries of the whole directory entries in the coherent accelerator as its shadow directory, for the cache lines allocated to it. In response to receiving an operation request, the accelerator determines a coherent proxy according to the cache line involved by the request, and communicates with the determined coherent proxy for the request.

With this accelerator sharing solution, each coherent proxy may remain un-touched and keeps snooping coherent transaction on local bus to update corresponding cached data state in the accelerator by checking the data state in its own distributed shadow directory.

According to one exemplary embodiment of the present disclosure, the accelerator may connect with multiple coherent proxies through a multiplexer. It is to be understood by those skilled in the art that any other suitable device may be used to connect the accelerator and the coherent proxies.

Figure 4:
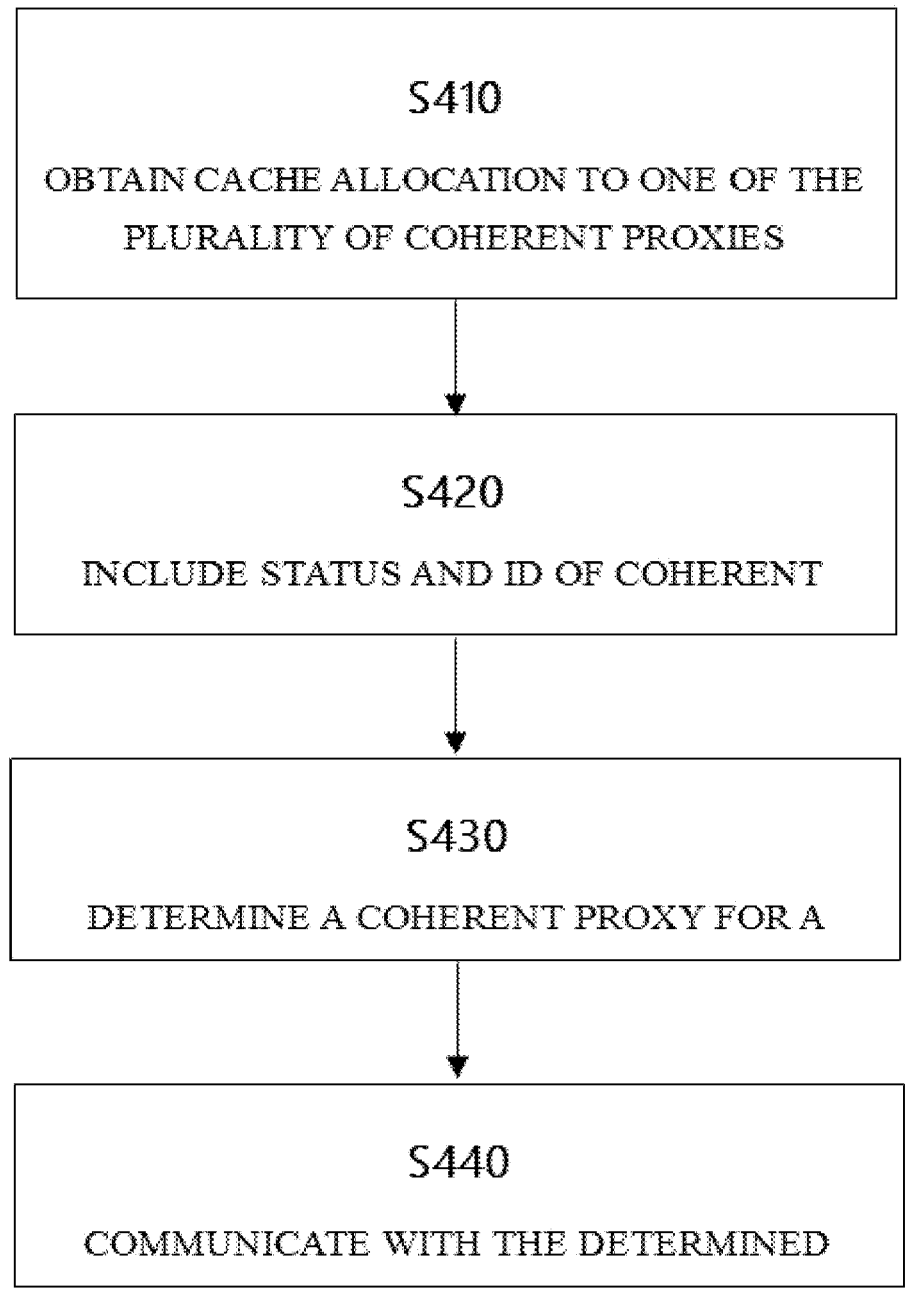
FIG. 4 shows a flow diagram of a method for sharing an accelerator through a plurality of coherent proxies in a multiple-processor system in accordance with exemplary embodiments of the present disclosure.

Now some exemplary embodiment will be described. FIG. 4 shows a flow diagram of a method for sharing an accelerator through a plurality of coherent proxies in a multiple-processor system in accordance with exemplary embodiments of the present disclosure. In the multiple-processor system, there are at least one memory shared by a plurality of processors. Each processor may communicate with the accelerator through its coherent proxy. And the coherent proxy helps to maintain the cache coherency between the processor and accelerator for the shared memory. According to exemplary embodiments of the present disclosure, the method 400 may be carried out by the accelerator itself or by a service layer for the accelerator, such as the PSL in CAPI.

In step 410, the cache lines in a cache associated with the accelerator are allocated to one of the plurality of coherent proxies. With the allocation information, the coherent accelerator would know which cache line in the cache corresponds to which coherent proxy. According to one exemplary embodiment of the present disclosure, the allocation information may be stored in a local store, such as a register.

In step 420, in a cache directory for the cache lines used by the accelerator, the status of the cache lines and the identification information of the coherent proxies to which the cache lines are allocated are provided. Each coherent proxies maintains a shadow directory for the cache lines allocated to it. According to one exemplary embodiment of the present disclosure, the status of the cache lines indicates different state of the cache lines in the cache. For example, a modified state may indicate that the accelerator has ownership of the cache line. An invalid state may indicate that the accelerator has no ownership of the cache line. It is to be understood by those skilled in the art that there may be different states depending on different coherent protocol is applied and the above examples are given merely for illustration without suggesting any limitation as to the scope of the present disclosure. The identification information of the coherent proxy may be used to indicate that to which coherent proxy this cache line is corresponding. According to one embodiment of the present disclosure, in the situation that there is only one coherent proxy for one socket, this identification information of the coherent proxy may also be the socket ID where the coherent proxy locates.

In step 430, in response to receiving an operation request, a coherent proxy corresponding to the request is determined.

In step 440, the accelerator communicates with the determined specific coherent proxy for the request.

FIG. 5 shows examples of the cache directory in the accelerator and shadow directories in the corresponding coherent proxies respectively in accordance with exemplary embodiments of the present disclosure. In the accelerator cache directory, the ID information of the proxy is included for the entry of each line. So when a request is received, the corresponding coherent proxy may be determined according to the cache lines involved in the request. And each coherent proxy maintains the shadow directory which includes the entries corresponding to the cache lines allocated to it. In the example shown in FIG. 5, coherent proxy #1 shadow directory includes entries for cache lines #1, 3, etc. while coherent proxy #2 shadow directory includes entries for cache lines #2, 4, etc. It is to be understood by those skilled in the art that any suitable cache directory format may be used here and the above examples are given merely for illustration without suggesting any limitation as to the scope of the present disclosure.

Next, for the sake of easy description, we are going to use CAPI as an example of coherent accelerator and CAPP as an example of coherent proxy to describe further details of the exemplary embodiments of the present disclosure. It is to be understood by those skilled in the art that the present disclosure should not be limited to CAPI and CAPP implements, but to any suitable accelerator and coherent proxy in a multiple-processor environment.

Figure 6:
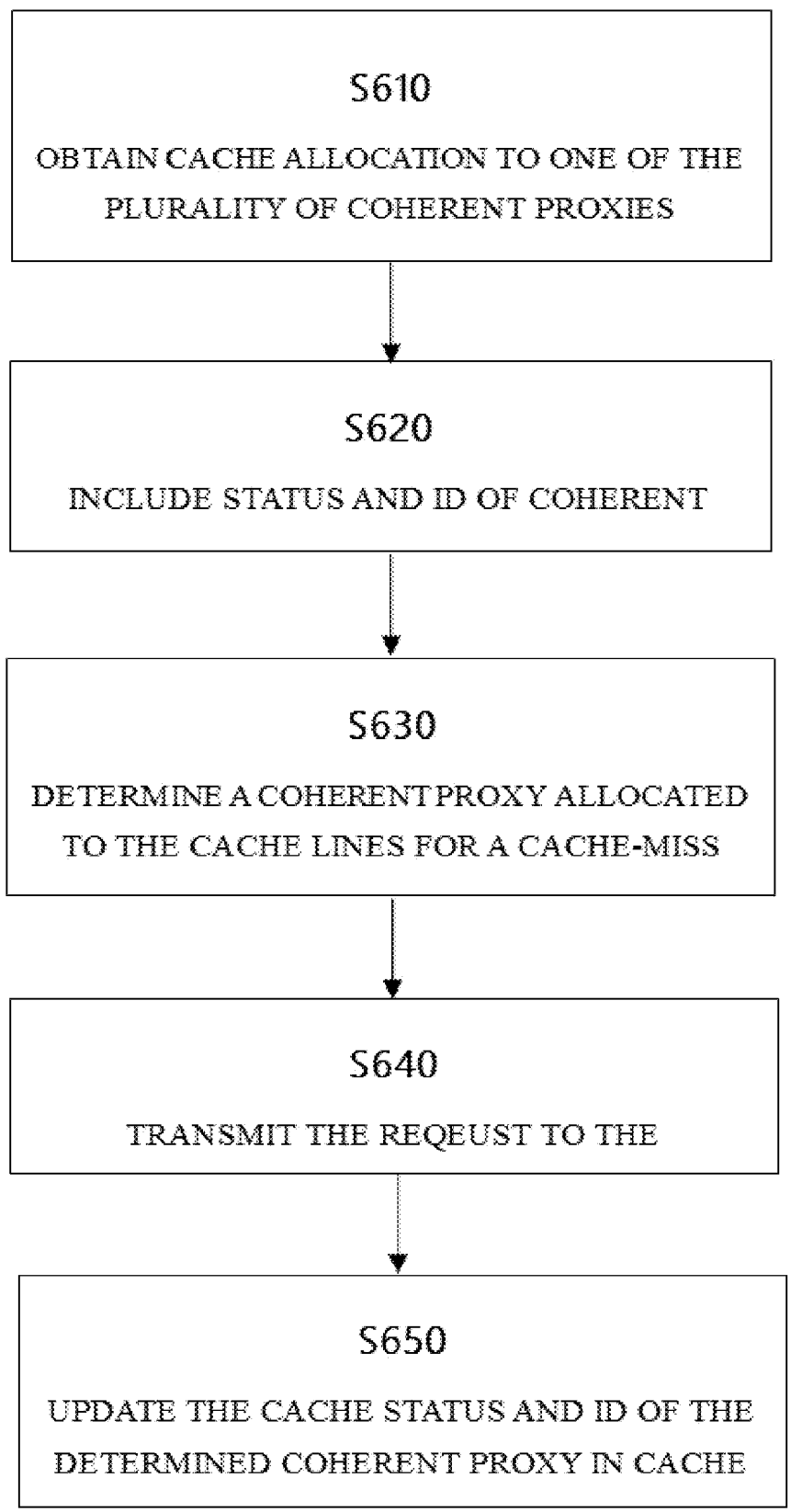
FIG. 6 shows a flow diagram of an exemplary process in accordance with an embodiment of the present disclosure.

FIG. 6 shows a flow diagram of an exemplary process in accordance with an embodiment of the present disclosure. Step 610 and step 620 are similar with the steps 410 and 420 in FIG. 4, so here the detailed description is omitted for those two steps.

In step 630, in response to receiving a cache-miss request from the accelerator, the cache line involved in the cache-miss request is identified, and a coherent proxy allocated to the cache line is determined. According to an embodiment of the present disclosure, a cache-miss request may refer to a request which may involve cache lines not present in the cache directory. For example, in CAPI situation, to store into a line on behalf of an AFU, the PSL must first have ownership of the lines. The PSL first checks for presence of the line in its cache directory. If the access misses in the PSL directory, which means that a cache-miss request is received, the corresponding coherent proxy would be identified according to the cache line allocation information. The cache line allocation information may be stored in a register and the register may be initialized by the hypervisor or the Operation System in the multiple-processor system. From the cache line allocation information, the identification information of the coherent proxy corresponding to the requested address is obtained.

In step 640, the accelerator transmits the request to the determined coherent proxy. And in step 650, the accelerator updates the corresponding cache line status and identification information of the determined coherent proxy in the cache directory. The specific coherent proxy will also update the cache line status in its shadow directory.

It should also be noted that, in some alternative implementations, the functions noted in the block may occur out of the order noted in the figures. For example, the two steps 640 and 650 shown in succession may, in fact, be executed substantially concurrently, or may be executed in the reversed order. In step 650, the accelerator may update the cache directory with the identification information of the coherent proxy when it obtains the information from the register, or it may not update the information in the cache directory until it receives the response from the specific coherent proxy and retrieves the identification information form the response.

Figure 7:
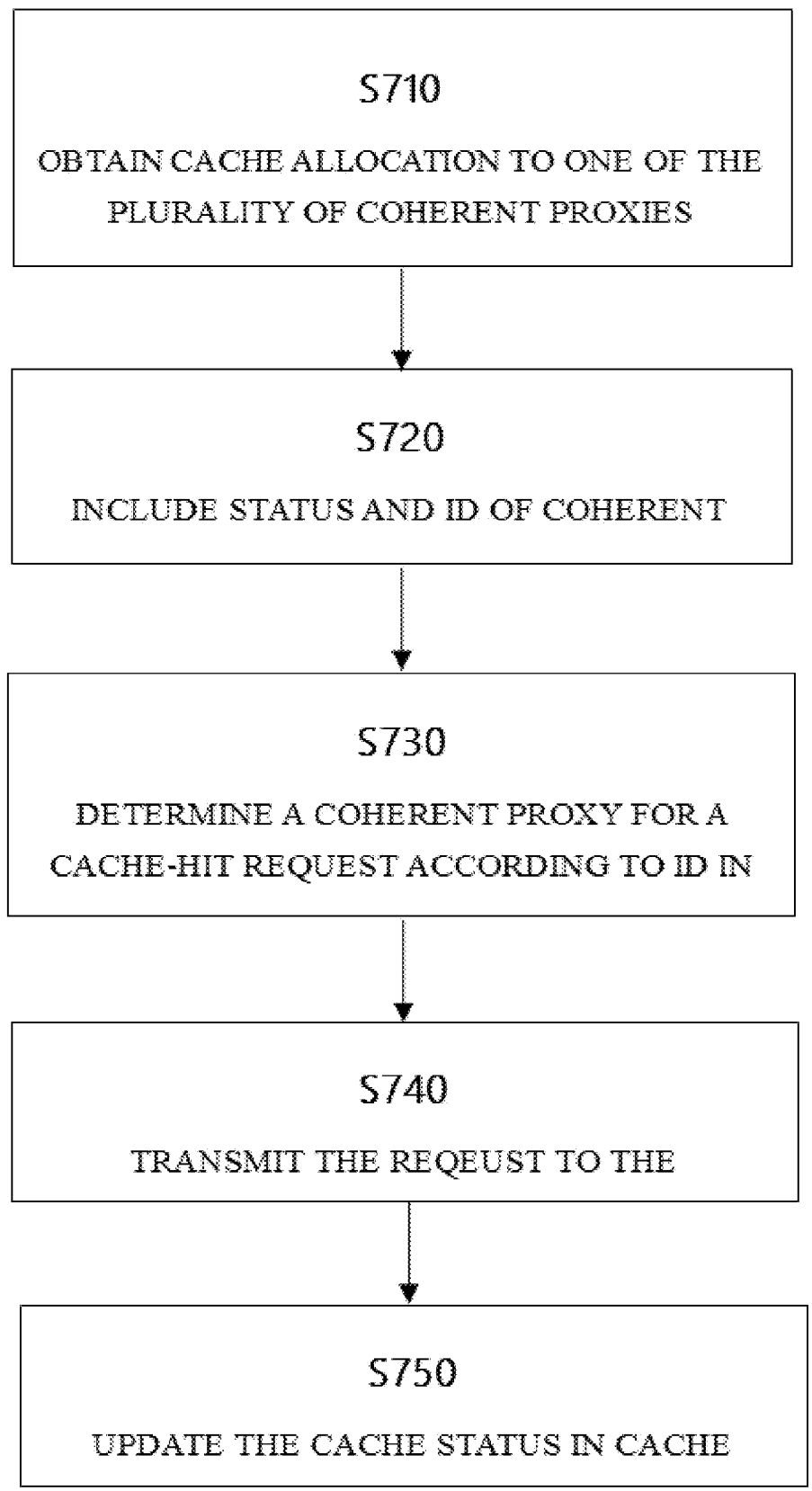
FIG. 7 shows a flow diagram of another exemplary process in accordance with an embodiment of the present disclosure.

FIG. 7 shows a flow diagram of another exemplary process in accordance with an embodiment of the present disclosure. Step 710 and step 720 are similar with the steps 410 and 420 in FIG. 4, so here the detailed description is omitted for those two steps.

In step 730, in response to receiving a cache-hit request from the accelerator, a specific coherent proxy corresponding to the request is determined according to the identification information corresponding to the hit cache line in the cache directory. The cache-hit request may refer to a request with the cache line present in the directory.

In step 740, the request is transmitted to the determined coherent proxy.

In step 750, the accelerator updates the corresponding cache line status in the cache directory.

It should also be noted that, in some alternative implementations, the functions noted in the block may occur out of the order noted in the figures. For example, the two steps 740 and 750 shown in succession may, in fact, be executed substantially concurrently, or may be executed in the reversed order.

Using the above mentioned CAPI as an example, to push a line from the PSL cache to memory, which may occur for example when a line owned by PSL needs to be evicted to make space for another line in the cache, PSL needs to issue a write command to the corresponding CAPP. Under such situation, the PSL first needs to check the cache directory to determine which CAPP it should send the request to. And the PSL may also need to push the modified data to the PHB for write-back to memory, and updates the state for the line in its directory to indicate that it no longer owns the line. Additionally, the CAPP updates the shadow directory to reflect that the line is now invalid.

According to another embodiment of the present disclosure, the coherent proxy may snoop a transaction on local bus, and check with the data state in its shadow directory. And then the coherent proxy may send a cache coherency request to the accelerator, reporting the transaction. After the accelerator gets the request, it sends back response to the coherent proxy, and updates the corresponding cache line status in the directory. The coherent proxy gets the back response from the accelerator and updates the corresponding data state in its shadow directory.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the disclosure may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A device for sharing an accelerator among a plurality of processors through a plurality of coherent proxies, the device comprising:
   a cache associated with the accelerator;
   a local store for storing cache allocation information, the cache allocation information indicating allocation of cache lines in the cache to one of a plurality of coherent proxies; and
   a cache directory for the cache lines used by the accelerator, including a status of the cache lines and identification information of the coherent proxies to which the cache lines are allocated, wherein each coherent proxy maintains a shadow directory of the cache directory for the cache lines allocated to that coherent proxy,
   wherein the device is configured to, in response to receiving an operation request, determine whether the operation request is a cache-miss request or a cache-hit request, determine a coherent proxy corresponding to the request, and communicate with the coherent proxy for the request.

2. The device of claim 1, wherein the accelerator connects with the plurality of coherent proxies through a multiplexer.

3. The device of claim 1, wherein the device is further configured to, in response to receiving a cache-miss request from the accelerator, identify a cache line involved in the cache-miss request, and determine a coherent proxy allocated to the cache line according to the cache allocation information, and the device is further configured to transmit the request to the coherent proxy, and update the cache directory with a current cache line status and identification information of the coherent proxy.

4. The device of claim 1, wherein the device is further configured to, in response to receiving a cache-hit request from the accelerator, identify a cache line involved in the cache-hit request, and determine a coherent proxy according to the identification information corresponding to the cache line, of the cache-hit request, in the cache directory, wherein the device is further configured to transmit the request to the coherent proxy, and update the cache directory with a current cache line status.

5. The device of claim 1, wherein the device is further configured to, in response to receiving a cache coherency request from the coherent proxy, update a corresponding cache line status in the cache directory according to the request.

6. A method for sharing an accelerator among a plurality of processors through a plurality of coherent proxies, the method comprising:
   obtaining cache allocation information indicating allocation of cache lines, in a cache associated with the accelerator, to one of a plurality of coherent proxies;
   in a cache directory for the cache lines used by the accelerator, providing a status of the cache lines and identification information of the coherent proxies to which the cache lines are allocated, wherein each coherent proxy maintains a shadow directory of the cache directory for the cache lines allocated to that coherent proxy;
   in response to receiving an operation request, determining whether the operation request is a cache-miss request or a cache-hit request;

determining a coherent proxy corresponding to the request; and communicating with the coherent proxy for the request.

7. The method of claim 6, wherein the accelerator connects with the plurality of coherent proxies through a multiplexer.

8. The method of claim 6, wherein determining a coherent proxy according to a cache line involved with the request comprises:

in response to receiving a cache-miss request from the accelerator, identifying the cache line involved in the cache-miss request, and determining a coherent proxy allocated to the cache line, wherein communicating with the coherent proxy for the request comprises:

transmitting the request to the coherent proxy for the request; and updating the cache directory with current cache line status and the identification information of the coherent proxy for the request.

9. The method of claim 6, wherein determining a coherent proxy according to a cache line involved with the request comprises:

in response to receiving a cache-hit request from the accelerator, identifying the cache line involved in the cache-hit request, and determining a coherent proxy according to the identification information corresponding to the cache line, of the cache-hit request, in the cache directory of the coherent proxy, wherein communicating with the coherent proxy for the request comprises:

transmitting the request to the coherent proxy for the request; and updating the cache directory with current cache line status.

10. The method of claim 6, further comprising:

in response to receiving a cache coherency request from the coherent proxy, updating a corresponding cache line status in the cache directory according to the request.

11. A computer program product being tangibly stored on a non-transient machine-readable medium and comprising machine-executable instructions for sharing an accelerator among a plurality of processors through a plurality of coherent proxies, the instructions, when executed on a device, causing the device to:

obtain cache allocation information indicating allocation of cache lines, in a cache associated with the accelerator, to one of a plurality of coherent proxies;

in a cache directory for the cache lines used by the accelerator, include a status of the cache lines and identification information of the coherent proxies to which the cache lines are allocated, wherein each coherent proxy maintains a shadow directory of the cache directory for the cache lines allocated to that coherent proxy;

in response to receiving an operation request, determining whether the operation request is a cache-miss request or a cache-hit request;

determine a coherent proxy corresponding to the request; and communicate with the coherent proxy for the request.

12. The computer program product of claim 11, wherein the instructions, when executed on the device, cause the device to:

in response to receiving a cache-miss request from the accelerator, identify a cache line involved in the cache-miss request, and determine a coherent proxy allocated to the cache line;

transmit the request to the coherent proxy; and update the cache directory with current cache line status and identification information of the coherent proxy.

13. The computer program product of claim 11, wherein the instructions, when executed on the device, cause the device to:

in response to receiving a cache-hit request from the accelerator, identify a cache line involved in the cache-hit request, and determine a coherent proxy according to the identification information corresponding to the cache line, involved in the cache-hit request, in the cache directory;

transmit the request to the coherent proxy for the request; and update the cache directory with current cache line status.

14. The computer program product of claim 11, wherein the instructions, when executed on the device, cause the device to:

in response to receiving a cache coherency request from the coherent proxy, update a corresponding cache line status in the cache directory according to the request.

* * * * *